(12) United States Patent
Ashoori et al.

(10) Patent No.: US 10,209,363 B2
(45) Date of Patent: *Feb. 19, 2019

(54) IMPLEMENTING A RESTRICTED-OPERATION REGION FOR UNMANNED VEHICLES

(71) Applicant: International Business Machines Corporation, Armonk, NY (US)

(72) Inventors: Maryam Ashoori, Richmond Hill (CA); Jonathan H. Connell, II, Cortlandt-Manor, NY (US); Jason B. Ellis, New York, NY (US); Robert G. Farrell, Cornwall, NY (US); Danny Soroker, Larchmont, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/745,650

(22) Filed: Jun. 22, 2015

(65) Prior Publication Data

US 2016/0291589 A1 Oct. 6, 2016

Related U.S. Application Data

(63) Continuation of application No. 14/672,855, filed on Mar. 30, 2015.

(51) Int. Cl.
*G05D 1/00* (2006.01)
*G05D 3/00* (2006.01)
(Continued)

(52) U.S. Cl.
CPC ............... *G01S 19/13* (2013.01); *G01S 1/08* (2013.01); *G01S 19/48* (2013.01); *G05D 1/101* (2013.01);
(Continued)

(58) Field of Classification Search
CPC ............... G05D 1/0011; G08G 5/0017; G08B 13/19652; B64C 39/024
(Continued)

(56) References Cited

U.S. PATENT DOCUMENTS

2016/0129999 A1* 5/2016 Mays ................... B64C 39/024
701/2
2016/0225264 A1* 8/2016 Taveira ................. B64C 39/024

FOREIGN PATENT DOCUMENTS

WO WO 2014001800 A1 * 1/2014 ....... G08B 13/19652

OTHER PUBLICATIONS

List of IBM Patents or Patent Applications Treated as Related; Jul. 29, 2015; pp. 1-2.
(Continued)

*Primary Examiner* — Mahmoud S Ismail
(74) *Attorney, Agent, or Firm* — Cantor Colburn LLP; Vazken Alexanian

(57) ABSTRACT

Embodiments are directed to a system for implementing a restricted-operation region. The system includes an instruction development module configured to be utilized in the development of a set of instructions that implement an operation policy of the restricted-operation region. The set of instructions is configured to, when interpreted, implement the operation policy by controlling at least one function of a vehicle that attempts to operate within the restricted-operation region. The system further includes a first transmitter configured to transmit the set of instructions to the vehicle, wherein a processor of the vehicle is configured to interpret the set of instructions based at least in part on a determination that the vehicle is attempting to operate within the restricted-operation region.

17 Claims, 11 Drawing Sheets

(51) Int. Cl.
　　　G06F 7/00　　　(2006.01)
　　　G06F 17/00　　(2006.01)
　　　G01S 19/13　　(2010.01)
　　　G08G 5/00　　　(2006.01)
　　　G08G 5/04　　　(2006.01)
　　　H04W 4/021　　(2018.01)
　　　H04W 4/04　　　(2009.01)
　　　G01S 19/48　　(2010.01)
　　　G01S 1/08　　　(2006.01)
　　　G05D 1/10　　　(2006.01)
(52) U.S. Cl.
　　　CPC ........... *G08G 5/006* (2013.01); *G08G 5/0013* (2013.01); *G08G 5/0026* (2013.01); *G08G 5/0069* (2013.01); *G08G 5/045* (2013.01); *H04W 4/021* (2013.01); *H04W 4/046* (2013.01)
(58) Field of Classification Search
　　　USPC ............................................................ 701/2
　　　See application file for complete search history.

(56) References Cited

OTHER PUBLICATIONS

Maryam Ashoori, "Implementing a Restricted-Operation Region for Unmanned Vehicles" U.S. Appl. No. 14/672,855, filed Mar. 20, 2015.

\* cited by examiner

IMPLEMENTING A RESTRICTED-OPERATION REGION FOR UNMANNED VEHICLES

DOMESTIC PRIORITY

The present application claims priority to U.S. Nonprovisional application Ser. No. 14/672,855 filed on Mar. 30, 2015 titled "Implementing a Restricted-Operation Region for Unmanned Vehicles," assigned to the assignee hereof and expressly incorporated by reference herein.

BACKGROUND

The present disclosure relates in general to systems and methodologies for implementing a restricted-operation region for unmanned vehicles. More specifically, the present disclosure relates to systems and methodologies for defining a restricted-operation region and implementing an operation policy for controlling the operation of an unmanned vehicle that attempts to operate within the restricted-operation region.

Unmanned vehicles (UVs) include unmanned aerial vehicles (UAVs), unmanned ground vehicles (UGVs) and unmanned underwater vehicles (UUVs). UVs have been developed for both civilian and military use to perform a variety of dangerous activities. For example, UVs can be used for applications where it may be inconvenient, dangerous or impossible to have a human operator present. UVs may be expendable or recoverable and can be operated autonomously or remotely. Historically, a significant use of UVs has been in the areas of intelligence surveillance and reconnaissance. Accordingly, a typical UV includes cameras and other surveillance equipment that capture intelligence.

UAVs are defined as powered aerial vehicles sustained in flight by aerodynamic lift over most of their flight path and guided without an onboard crew. UGVs are defined as vehicles that operate while in contact with the ground and without an onboard human presence. In a typical configuration, the UGV includes a set of sensors to observe the environment. The UGV will typically either autonomously make decisions about its behavior or pass the information to a human operator at a different location who will control the vehicle remotely.

Although UVs have a long history of military use, their commercial and consumer uses are more recent. Federal, state and local laws have struggled to develop consistent and coherent regulations covering commercial and consumer uses of UVs. The actual and potential problems with commercial and consumer use of UVs are numerous including infringement of privacy rights, breach of civil aviation regulations and data protection issues. The proliferation of consumer UVs has generated news stories about unfortunate occurrence involving consumer UVs. One example of such an occurrence reportedly involved a consumer UAV that flew into a fireworks show to capture aerial video of the fireworks. The UAV crashed into the middle of the crowd injuring at least one person before it was immobilized with a chair leg. UAVs may be damaged during flight in a way that would prevent the operator from safely operating the device, resulting in a "fly-off" or a crash landing into spectators. UAV flights into fireworks shows may also be unsafe because of the increased risk of hazardous debris (from the fireworks or the UAV) falling into spectator areas. There is also the possibility that a firework colliding with a UAV may divert the pyrotechnic downward into spectator areas, causing it to detonate where it otherwise should not.

Geo-fencing is a feature that uses the global positioning system (GPS) or radio frequency identification (RFID) to define geographical boundaries. Geo-fencing is often utilized in software programs to act as a virtual barrier. Programs that incorporate geo-fencing allow an administrator to set up triggers such that when a device enters (or exits) the boundaries defined by the administrator, a text message or email alert is sent. Geo-fencing technology has been proposed for application in several systems. For example, a network administrator can set up alerts such that when a hospital-owned iPad leaves the hospital grounds, the administrator can disable the device. A marketer can geo-fence a retail store in a mall and send a coupon to a customer who has downloaded a particular mobile app when the customer (and his/her smart phone) crosses the boundary.

It has been proposed to apply the concepts of geo-fencing to a UAV in order to keep the UAV within a prescribed area.

SUMMARY

Embodiments are directed to a system for implementing a restricted-operation region. The system includes an instruction development module configured to be utilized in the development of a set of instructions that implement an operation policy of the restricted-operation region. The set of instructions is configured to, when interpreted, implement the operation policy by controlling at least one function of a vehicle that attempts to operate within the restricted-operation region. The system further includes a first transmitter configured to transmit the set of instructions to the vehicle, wherein a processor of the vehicle is configured to interpret the set of instructions based at least in part on a determination that the vehicle is attempting to operate within the restricted-operation region.

Embodiments are further directed to a method of implementing a restricted-operation region. The method includes utilizing an instruction development module to develop a set of instructions that implement an operation policy of the restricted-operation region. The set of instructions is configured to, when interpreted, implement the operation policy by controlling at least one function of a vehicle that attempts to operate within the restricted-operation region. The method further includes transmitting, by a first transmitter, the set of instructions to the vehicle, wherein a processor of the vehicle is configured to interpret the set of instructions based at least in part on a determination that the vehicle is attempting to operate within the restricted-operation region.

Embodiments are further directed to a computer program product for implementing a restricted-operation region. The computer program product includes a computer readable storage medium having program instructions embodied therewith, wherein the computer readable storage medium is not a transitory signal per se. The program instructions are readable by a processor circuit to cause the processor circuit to perform a method that includes initiating, by the processor, a transmission to a vehicle of a set of instructions that implement an operation policy of the restricted-operation region by controlling at least one function of a vehicle that attempts to operate within the restricted-operation region, wherein a processor of said vehicle is configured to interpret said set of instructions based at least in part on a determination that said vehicle is attempting to operate within the restricted-operation region.

Embodiments are further directed to a system for implementing a restricted-operation region. The system includes a communication channel between a first transmitter and a vehicle attempting to operate within the restricted-operation region. The system further includes a processor configured to interpret a set of instructions that are configured to control, over the communication channel, at least one function of the vehicle to implement an operation policy of the restricted-operation region.

Embodiments are further directed to a vehicle for implementing at least one restricted-operation region. The vehicle includes a receiver that is configured to receive a first set of instructions that specifies a first operation policy of a first restricted-operation region. The receiver is further configured to receive data of the first restricted-operation region. The first set of instructions is configured to, when interpreted, implement the first operation policy by controlling at least one function of the vehicle. A processor of the vehicle is configured to interpret the set of instructions based at least in part on the data of the first restricted-operation region, wherein the data of the first restricted-operation region includes data indicating that the vehicle is attempting to operate within the first restricted-operation region.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1:
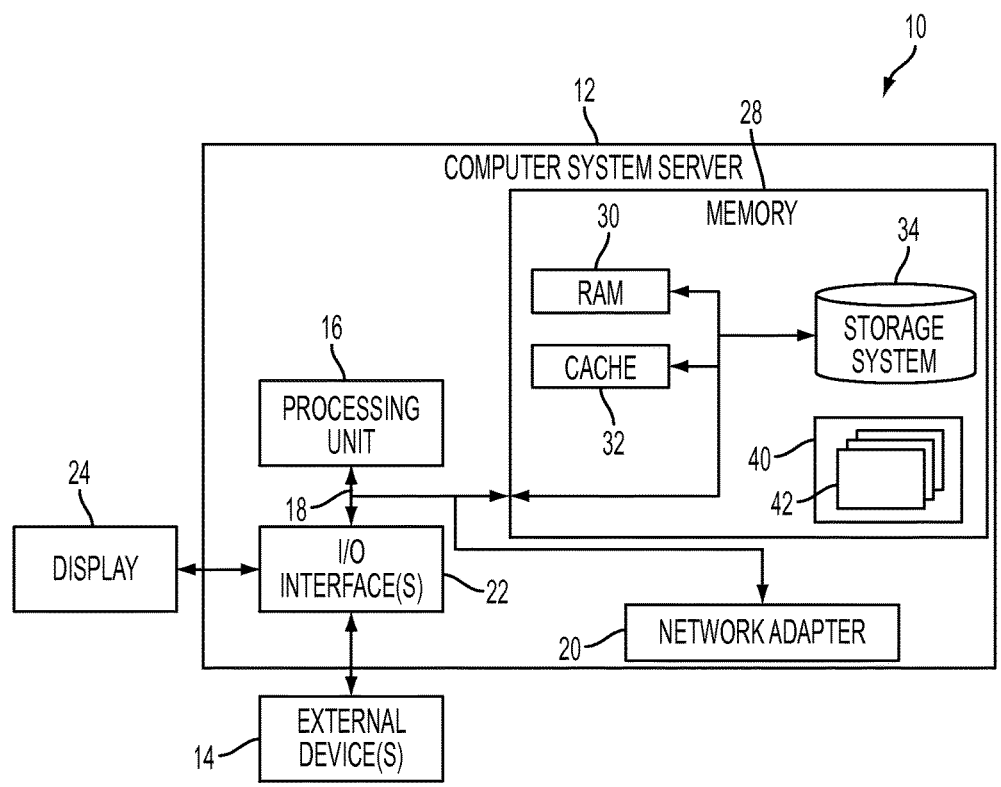
FIG. 1 depicts a cloud computing node according to one or more embodiments.

In the accompanying figures and following detailed description of the disclosed embodiments, the various elements illustrated in the figures are provided with three digit reference numbers. The leftmost digits of each reference number corresponds to the figure in which its element is first illustrated.

DETAILED DESCRIPTION

It is understood in advance that although this disclosure includes a detailed description on cloud computing, implementation of the teachings recited herein are not limited to a cloud computing environment. Rather, embodiments of the present disclosure are capable of being implemented in conjunction with any networked or other type of computing environment now known or later developed. Additionally, although the present disclosure includes embodiments directed to unmanned vehicles, implementation of the teachings recited herein may apply to manned vehicles as well.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
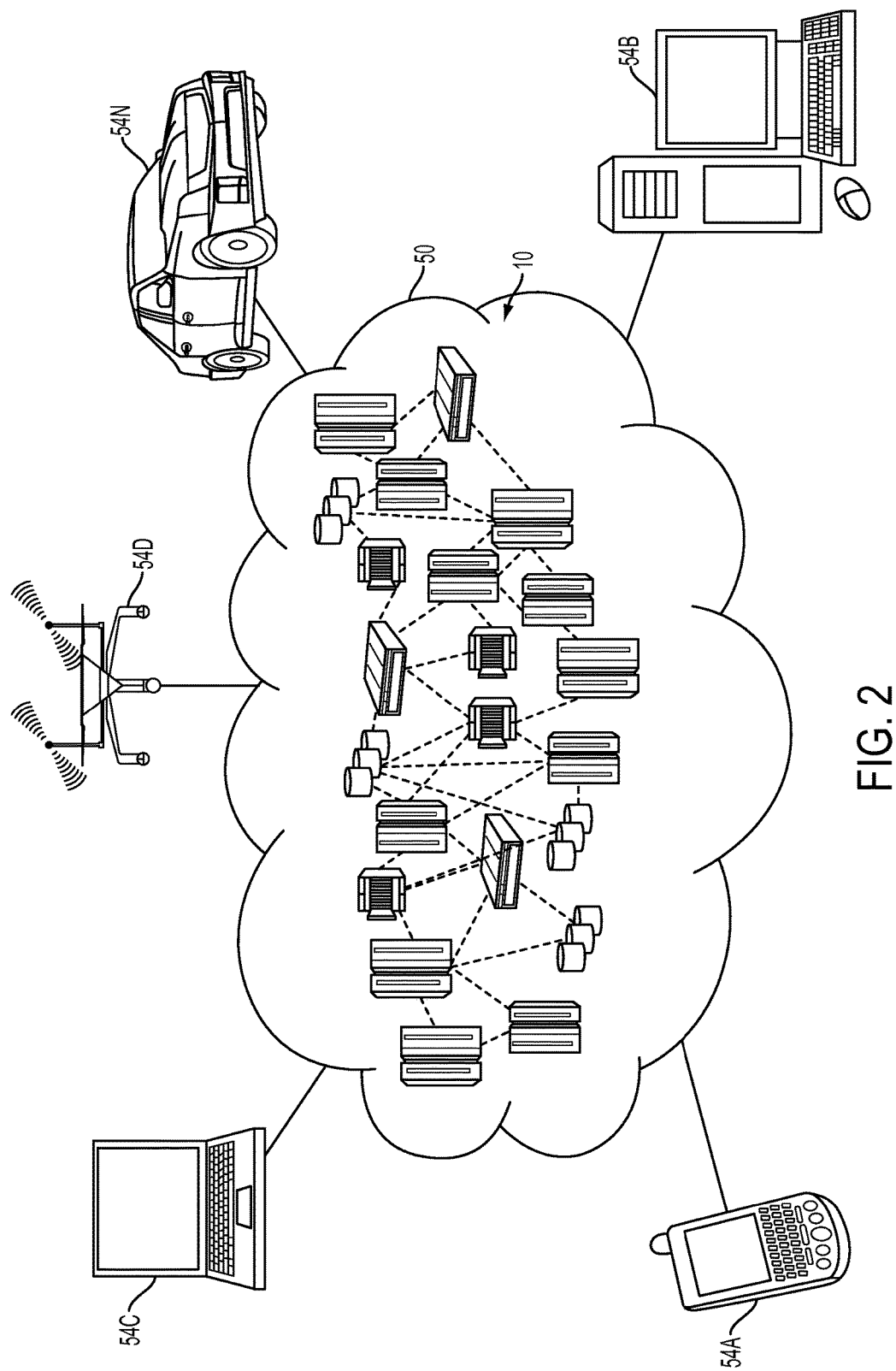
FIG. 2 depicts a cloud computing environment according to one or more embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, UAV 54D, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
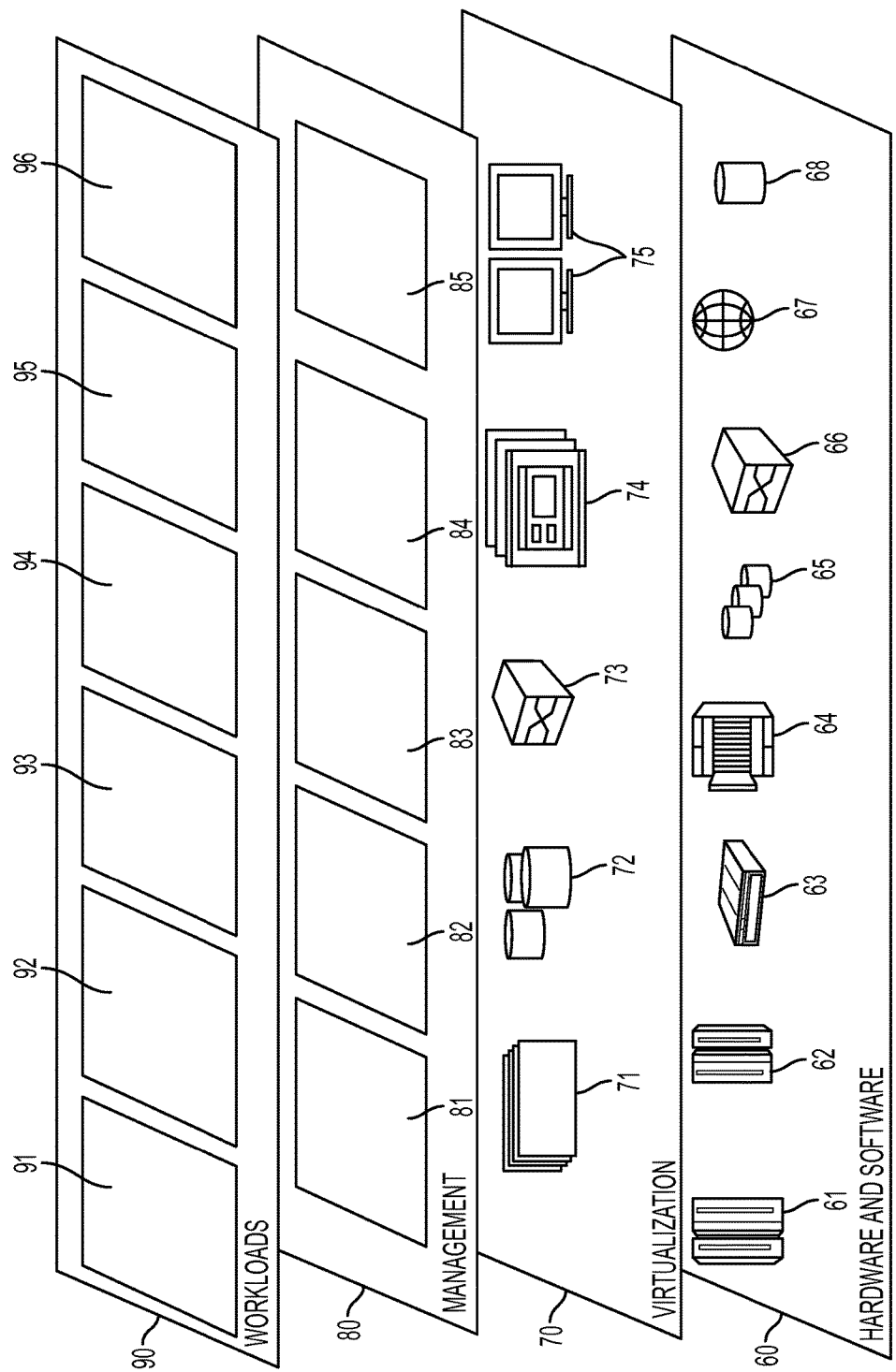
FIG. 3 depicts abstraction model layers according to one or more embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a module 96 for supporting the definition and implementation of a restricted-operation region, along with the implementation of an operation policy for controlling the operation of a UV that attempts to operate within the restricted-operation region.

As previously noted herein, UVs include UAVs, UGVs and UUVs. UVs have been developed for both civilian and military use to perform a variety of dull, dirty, and dangerous activities. For example, UVs can be used for applications where it may be inconvenient, dangerous or impossible to have a human operator present. UVs may be expendable or recoverable and can be operated autonomously or remotely. Historically, a significant use of UVs has been in the areas of intelligence surveillance and reconnaissance. Accordingly, a typical UV includes cameras and other surveillance equipment to capture intelligence.

UAVs are defined as powered aerial vehicles sustained in flight by aerodynamic lift over most of their flight path and guided without an onboard crew. UGVs are defined as vehicles that operate while in contact with the ground and without an onboard human presence. In a typical configuration, the UGV includes a set of sensors to observe the environment. The typical UGV either autonomously makes decisions about its behavior, or it passes the information to a human operator at a different location who controls the vehicle remotely.

Although UVs have a long history of military use, their commercial and consumer uses are more recent. Federal, state and local laws have struggled to develop consistent and coherent regulations covering the commercial and consumer use of UVs. The actual and potential problems with commercial and consumer use of UVs are numerous including infringement of privacy rights, breach of civil aviation regulations and data protection issues. The proliferation of consumer UVs has generated countless news stories about unfortunate occurrence involving consumer UVs. One such occurrence reportedly involved a consumer UAV that flew into a fireworks show to capture aerial video of the fireworks. The UAV crashed into the middle of the crowd injuring at least one person before it was immobilized with a chair leg. UAVs may be damaged during flight in a way that would prevent the operator from safely operating the device, resulting in a "fly-off" or a crash landing into spectators. UAV flights into fireworks shows may also be unsafe because of the increased risk of hazardous debris (from the fireworks or the UAV) falling into spectator areas. There is also the possibility that a firework colliding with a UAV may divert the pyrotechnic downward into spectator areas, causing it to detonate where it otherwise should not.

Geo-fencing is a feature that uses the GPS and/or RFID to define geographical boundaries. Geo-fencing is often implemented in software programs. Thus, a geo-fence acts as a virtual barrier. Programs that incorporate geo-fencing allow an administrator to set up triggers such that when a device enters (or exits) the boundaries defined by the administrator, a text message or email alert is sent. Geo-fencing technology has been proposed for a number of uses. For example, a network administrator can set up alerts so when a hospital-owned iPad leaves the hospital grounds, the administrator can disable the device. A marketer can geo-fence a retail store in a mall and send a coupon to a customer who has downloaded a particular mobile app when the customer (and his/her smart phone) crosses the boundary. It has been proposed to apply the concepts of geo-fencing to UAVs in order to keep the UAV within a prescribed area.

The present disclosure relates in general to systems and methodologies for implementing a restricted-operation region for UVs. More specifically, the present disclosure relates to systems and methodologies for defining a restricted-operation region and implementing an operation policy for controlling the operation of a UV that attempts to operate within the restricted-operation region. Workloads layer and module 96 may provide some or all of the functionality to support one or more embodiments of the present disclosure.

Turning now to an overview of the present disclosure, one or more embodiments are directed to a system that allows a user to define a restricted-operation region for a particular location, along with an operational policy for controlling the operation of UVs that attempt to operate within the restricted-operation region. The restricted-operation region may be defined in both space and time using a 4-D area (e.g., coordinates of vertices of a 3D polyhedron plus a standardized time interval using X, Y and Z axes, plus a time element). Although a range of technologies could be used to implement the restricted-operation region, one or more embodiments utilize a Non-Directional Beacon (NDB) transmitter at the particular location to generate and transmit a beacon signal or other electric or radio signal from the location. The beacon transmitter determines its own coordinates using GPS and uses these coordinates to compute the globally-positioned coordinates of the restricted-operation region. The beacon transmitter then transmits the GPS restricted-operation region to the UV The restricted-operation region may be divided into a plurality of sub-regions including, for example, a notification sub-region, a warning sub-region and a limited-operation sub-region. The sub-regions may be disconnected or concentric or other 3-D and 4-D spatio-temporal arrangements.

Although the basic operations of the UV remain intact, limited modification is made to the UV to allow it to receive additional communications and control software programs. For example, modification may be made to the operating system of the UV to allow the UV to receive the signals that define the restricted-operation region, along with instructions. The instructions include control instructions that control functions of a UV, wherein it has been determined that the UV is attempting to operate within the restricted-operation region. The control instructions implement a predetermined operation policy of the restricted-operation region.

The instructions may be transmitted to the UAV from a variety of sources, including but not limited to a server, a networked environment, a service (e.g., code on a server that handles requests and/or transmits replies), a cloud computing system, a remote computer and the same NDB transmitter that transmits the NDB signals. The actual control instructions implemented by the UAV may be made dependent on the location of the UAV within the restricted-operation region. To facilitate this, the restricted-operation region includes a plurality of sub-regions, including but not limited to a notification sub-region, a warning sub-region and a limited-operation region. If the UAV determines that it is attempting to operate within the notification sub-region, the UAV function controlled by the instructions is a notification communication function. If the UAV determines that it is attempting to operate within the warning sub-region, the UAV function controlled by the instructions is a warning communication function. If the UAV determines that it is attempting to operate within the limited-operation sub-region, the UAV function controlled by the instructions is a limited operation function.

The control instructions of the UAV may also include conflict resolution functionality that allows the UAV to select one NDB transmitter if it is flying in an area of overlap between more than one NDB signals. For example, a UAV may simultaneously attempt to operate within in a first restricted-operation region of a first location and within a second restricted-operation region of a second location. The UAV may use a variety of conflict resolution criteria to select and respond to either the instructions of the first restricted-operation region or the instructions of the second restricted-operation region. For example, if the UAV is simultaneously attempting to operate within a notification sub-region of the first restricted-operation region and within a limited-operation sub-region of the second restricted-operation region, the modified operating system of the UAV may prioritize the selection and execution of the instructions of a limited-operation sub-region.

Figure 4A:
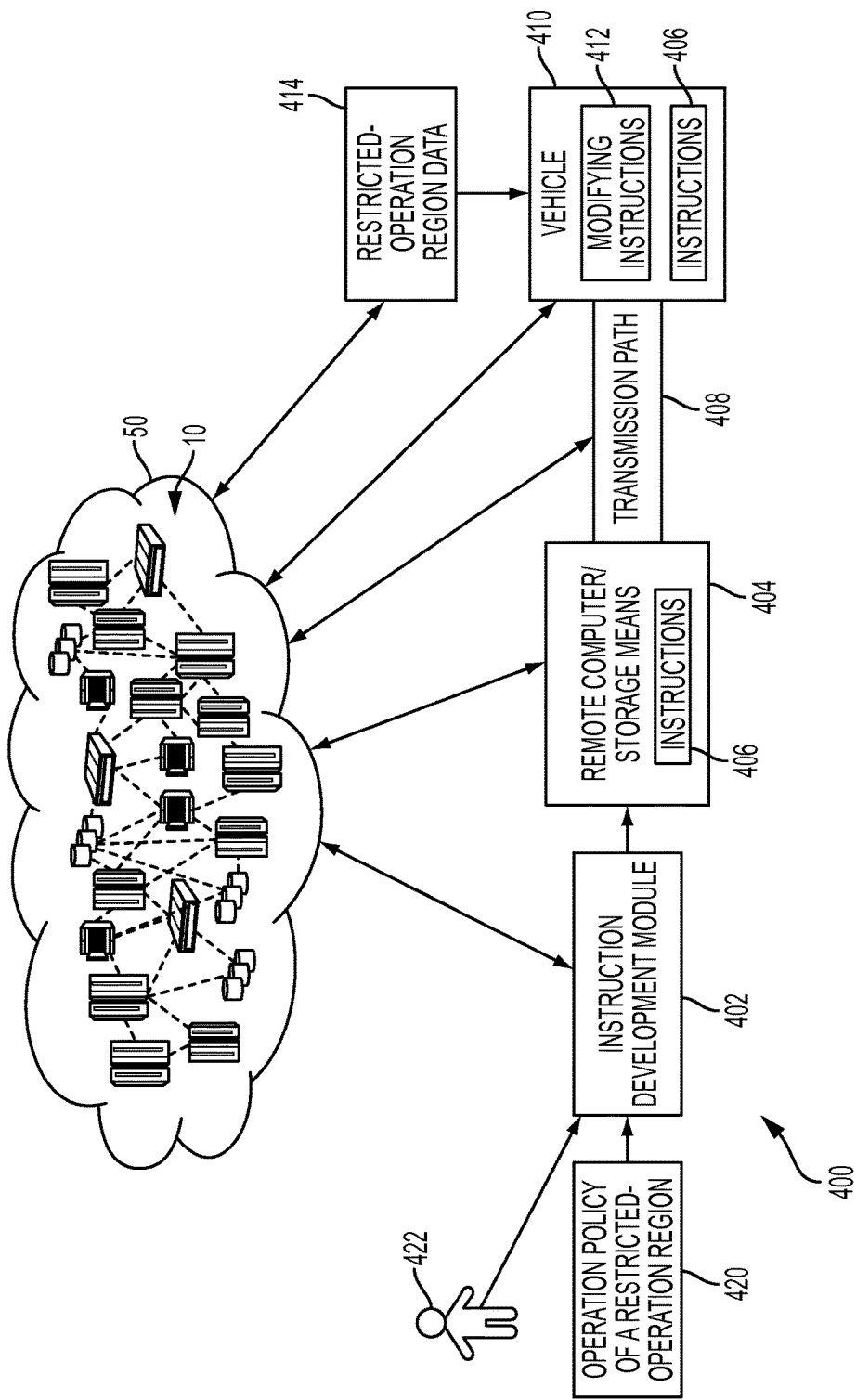
FIG. 4A depicts a diagram illustrating a system according to one or more embodiments.

Turning now to a more detailed description of the present disclosure, FIG. 4A depicts a diagram illustrating a system 400 according to one or more embodiments. System 400 includes an instruction development module 402, cloud 50 (also shown in FIG. 2), nodes 10, a remote computer/storage means 404 holding a set of instructions 406, a transmission path 408, a vehicle 410 and a set of restricted-operation region data 414, configured and arranged and shown. Cloud 50 may supplement, support or replace some or all of the functionality of instruction development module 402, remote computer/storage means 404 holding instructions 406, vehicle 410 and restricted-operation region data 414. Additionally, some or all of the functionality of instruction development module 402, remote computer 404 holding instructions 406, vehicle 410 and restricted-operation region data 414 may be implemented as a node 10 (shown in FIGS. 1 and 2) of cloud 50. Cloud 50 is one example of a networked computing environment that may be used to implement one or more embodiments of the present disclosure. As previously noted herein, it is understood that although this disclosure includes a detailed description on cloud computing, implementation of the teachings recited herein are not limited to a cloud computing environment. Rather, embodiments of the present disclosure are capable of being implemented in conjunction with any networked or other type of computing environment now known or later developed.

Figure 5A:
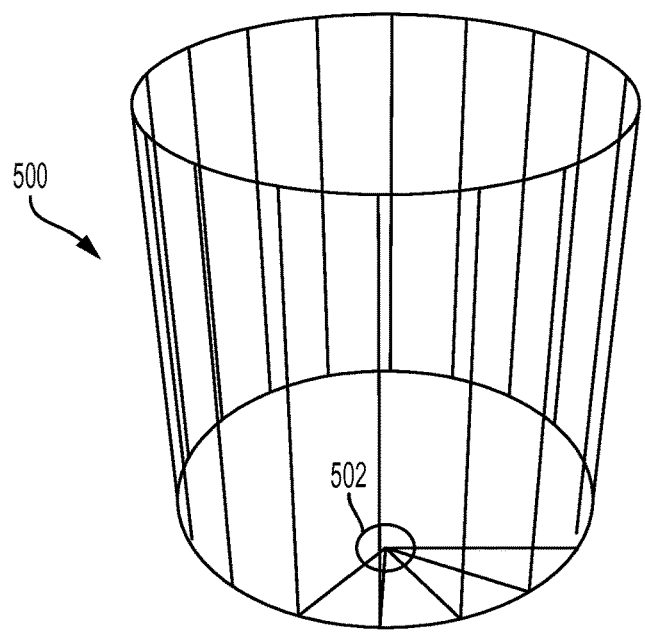
FIG. 5A depicts a diagram illustrating a restricted-operation region according to one or more embodiments.
Figure 5B:
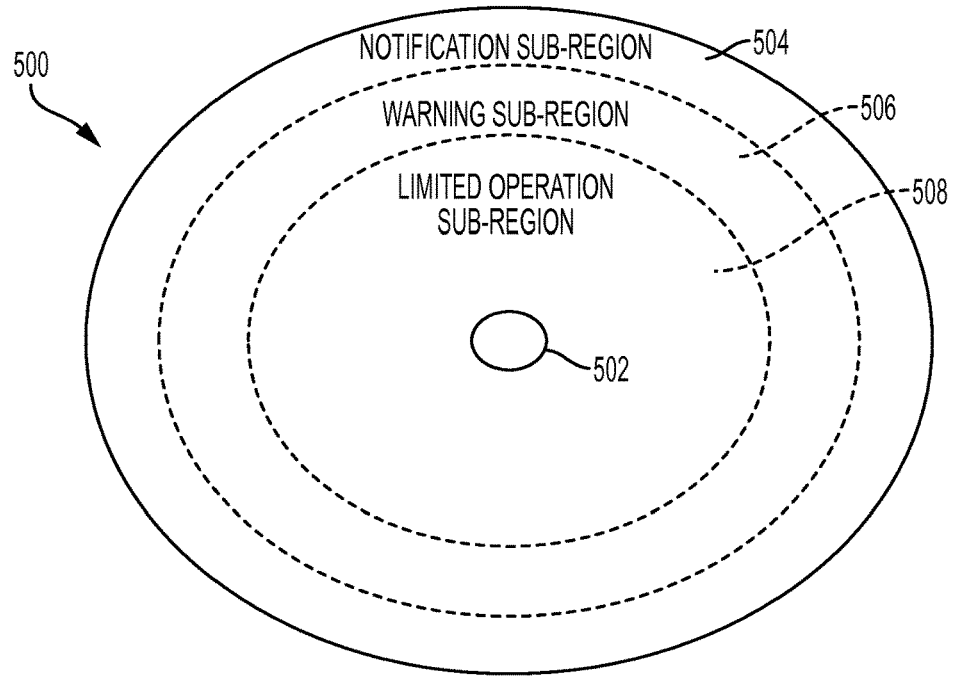
FIG. 5B depicts a diagram illustrating a restricted-operation and various sub-regions thereof according to one or more embodiments.

In operation, an operation policy 420 is developed for a restricted-operation region 500 of a particular location within restricted-operation region 500. Details of an exemplary restricted-operation region 500 are illustrated in FIGS. 5A and 5B and described in greater detail later in this disclosure. In general, restricted-operation region 500 is defined by multiple dimensions, such as space dimensions and time dimensions. Operation policy 420 describes the general rules for the operation of vehicle 410 when vehicle 410 attempts to operate within restricted-operation region 500. For example, if the location is a fireworks show taking place at a baseball stadium after the conclusion of a major league baseball game between the hours of 9:30 PM and 10:15 PM, an operation policy for the fireworks display location is a written description of how a UV (e.g., a UAV) should operate if/when the UV attempts to operate within the defined restricted-operation region around the fireworks display between 9:30 PM and 10:15 PM.

A programmer 422 uses instruction development module 402 to develop instructions 406 that are stored on remote computer/storage means 404. In general instruction development module 402 refers broadly to the use of known computer program development techniques to prepare the instructions of a computer program that carry out the operation policy, run those instructions on the computer, test the program to see if it is working properly and makes corrections to the program. Instructions 406 may be implemented as a declarative specification (or data) that is interpreted by the receiving unit (e.g., a UV). Alternatively, instructions 406 may be a full set of instructions with all the code fully developed. As used in the present disclosure, the term instruction refers to both a declarative specification and to a full set of code instructions.

Developing program instructions involves steps similar to any problem-solving task. There are generally five main operations in the programming process, including defining the problem, planning the solution, coding the program, testing the program and documenting the program. Coding the program expresses the solution (e.g., operation policy 420) in a programming language. The logic behind the solution is translated from a flowchart or pseudocode or some other tool to a programming language. A programming language is a set of rules that provides a way of instructing the computer what operations to perform. There are many programming languages, including for example, BASIC, COBOL, Pascal, FORTRAN, Java, Python, and C. The coded program is then keyed using instruction development module 402 (e.g., a terminal, a text editor or a personal computer) in a form the computer can understand.

Instructions 406 are provided to and stored on remote computer/storage means 404. From remote computer/storage means 404, instructions 406 may be distributed among the various nodes (e.g., cloud 50, vehicle 410) of system 400 in a variety of ways. For example, instructions 406 may be provided to cloud 50, which either interprets or transmits instructions 406. In configurations in which cloud 50 interprets instructions 406, cloud 50 provides control signals to vehicle 410 over, for example, an ad hoc network. The control signals to vehicle 410 from cloud 50 would, in effect, take over operation of vehicle 410 under certain conditions as prescribed by instructions 406 and operation policy 420.

In configurations in which cloud 50 transmits instructions 406, cloud 50 may transmit instructions 406 through direct communication (e.g., over an ad hoc network) with vehicle 410 or through transmission path 408. Remote computer/storage means 404 may also provide instructions 406 to vehicle 410 over transmission path 408. In general, transmission path 408 is any path or channel between two nodes in a network. Transmission path 408 may take a variety of formats, including any device (e.g., network card, portable flash storage, modem, etc.) that enables remote computer/storage means 404 to communicate with one or more other computing devices, such as vehicle 410 or cloud 50. Such communication may include manual intervention, such as storing instructions 406 in a portable computer program product that may be manually inserted into vehicle 410 so that instructions 406 may be downloaded from the portable computer program product. Such communication may also occur via Input/Output (I/O) interfaces over one or more networks such as a local area network (LAN), a general wide area network (WAN), a public network (e.g., the Internet) and/or ad hoc networks. Ad hoc wireless communication between devices might be loosely defined as a scheme, often referred to as ad hoc networking, which allows devices to establish communication, anytime and anywhere without the aid of a central infrastructure.

Transmission path 408 may be secure/encrypted or only operating within certain frequency ranges to allow certain classes of transmitters to communicate with certain classes of receivers. For example, a consumer UV may have open communication while a commercial UAV's communications may have a low level of encryption. A government or military UV may be at an even higher level of security. Under some conditions, UVs operating in a given region may not be allowed to decode the transmission regarding the restricted operation region. For example, there may be communications over transmission path 408 to commercial UVs indicating where to pick up packages that are not seen by consumer UVs.

Thus, vehicle 410 can receive instructions 406 over transmission path 408 or by direct communication with remote computer/storage means 404 or cloud 50 over, for example, an ad hoc network. Vehicle 410 may take a variety of forms including but not limited to UAVs, UGVs and UUVs. As previously noted herein, UVs have been developed for both civilian and military use to perform a variety of dull, dirty, and dangerous activities. For example, UVs can be used for applications where it may be inconvenient, dangerous or impossible to have a human operator present. UVs may be expendable or recoverable and can be operated autonomously or remotely. Historically, a significant use of UVs has been in the areas of intelligence surveillance and reconnaissance. Accordingly, vehicle 410 may include cameras and other surveillance equipment to capture the intelligence.

Vehicle 410 is provided with modifying instructions 412 that modify the standard operation of vehicle 410 such that it is able to receive either instructions 406 or control signals (e.g., from cloud 50). In configurations in which vehicle 410 receives instructions 406, modifying instructions 412 allow an operating system of vehicle 410 to interpret instructions 406, which, in effect, take over operation of vehicle 410 under certain conditions as prescribed by operation policy 420/instructions 406. In configurations in which vehicle 410 receives control signals, modifying instructions 412 allow an operating system of vehicle 410 to respond to the received control signals such that the received control signals, in effect, take over operation of vehicle 410 under certain conditions as prescribed by operation policy 420/instructions 406.

Vehicle 410 includes functionality (e.g., GPS, altimeters, etc.) that allows vehicle 410 to determine a position of vehicle 410. Vehicle 410 also receives restricted-operation region data 414. In general, restricted-operation region data 414 includes any type of data about dimensions (e.g., space and time dimensions) of restricted-operation region 500. Vehicle 410 further includes functionality that allows vehicle 410 to determine a position of vehicle 410 with respect to restricted-operation region 500. An example of a restricted-operation region 500 is illustrated in FIGS. 5A and 5B and described in greater detail later in this disclosure. In general, restricted-operation data 414 may be defined in both space and time using a 4-D area (e.g., X, Y and Z axes, plus a time element). Although a range of technologies could be used to implement the disclosed restricted-operation region, one or more embodiments utilize a transmitter within the location that transmits a non-directional beacon (NDB) having X, Y and Z axes, plus an optional time element. The restricted-operation region may be stationary or moving. The restricted-operation region may also be divided into a plurality of sub-regions including, for example, a notification sub-region 504, a warning sub-region 506 and a limited-operation sub-region 508, all of which are shown in FIG. 5B.

For configurations in which the interpretation of regions and their associated operation policy is left up to the UV, from a security point-of-view, certain instructions to the UV may in effect disclose proprietary information. For instance, even from far away, the UV could see instructions such as "if you come within 1000 ft of location XYZ you must immediately land." This instruction might inadvertently suggest to the UV that location XYZ might be a high value military asset and, despite any camouflage XYZ might have, crashing at XYZ will effectively destroy the target. Operating UVs at different frequencies or encryption may address this issue. Another way around this issue may be to specify that only the most relevant instruction ("if then" rule) is transmitted to the UV, and the transmission only occurs when it is determined that the UV is in, or about to be in, the restricted zone (i.e. some ground-based sensing also). Still another way around this issue is for the UV to sense then transmit its position to a central (secure) server that acts as a clearinghouse for all local airspace restrictions. What comes back are just functional directives (the data/specification) as opposed to "if then" rules, and it is the sever that determines the region violation. Hence, only the server knows the locations of the regions.

Based at least in part on restricted-operation data 414 and the determination of the position of vehicle 410 with respect to restricted-operation region 500, vehicle 410 interprets instructions 406, or responds to received control signals, which, in effect, cause vehicle 410 to operate in accordance with operation policy 420. For example, based at least in part on a determination that a position of vehicle 410 is within notification sub-region 504 (shown in FIG. 5B), operation policy 420 (via instructions 406 and/or control signals) may instruct vehicle 410 to initiate a function that provides various notifications, including for example a notification that vehicle 410 is attempting to operate within restricted-operation region 500. Additionally, based at least in part on a determination that a position of vehicle 410 is within warning sub-region 506 (shown in FIG. 5B), operation policy 420 (via instructions 406 and/or control signals) may instruct vehicle 410 to initiate a function that provides various warnings, including for example a warning that vehicle 410 is attempting to operate within restricted-operation region 500 and certain operations of vehicle 410 may be taken over, limited and/or disabled soon. Additionally, based at least in part on a determination that a position of vehicle 410 is within limited-operation sub-region 508 (shown in FIG. 5B), operation policy 420 (via instructions 406 and/or control signals) may instruct vehicle 410 to initiate a function that takes over, limits and/or disables certain operations of vehicle 410. The position of vehicle 410 may be determined in a number of ways, including but not limited to a comparison of a current position of vehicle 410 to a restricted-operation region or sub-region, and a comparison of a projected future position of vehicle 410 to a restricted-operation region or sub-region.

Examples of functions that take over, limit and/or disable certain operations of vehicle 410, wherein vehicle 410 is implemented as a UAV, include but are not limited to: a required power down and return to base, or a hover in place, if the UAV is about to breach certain sub-regions of restricted-operation region 500 (e.g., for a military zone); do not enter certain sub-regions of restricted-operation region 500 (e.g., for an airport); wait until 3:00 PM to enter certain sub-regions of restricted-operation region 500 and/or leave certain sub-regions of restricted-operation region 500 by 5:30 PM (e.g., for a fireworks display); turn off a camera (or other sensing/recording devices) below a certain altitude for certain sub-regions of restricted-operation region 500 during a given time period (e.g., for a celebrity event); fly within a certain altitude at certain speed in certain sub-regions of restricted-operation region 500 (e.g., for avoiding buildings); and reroute around certain sub-regions of restricted-operation region 500 during a given time period (e.g., for a public event such as a parade). In addition to initiating the above-described functions, operation policy 420 (via instructions 406 and/or control signals) may initiate other countermeasures such as alerting police or other human enforcers (e.g., via an email transmission), or sounding an alert for people in the affected restricted-operation region. More extreme countermeasures are also possible in certain situations where the harm that may be caused by the UV's presence in a particular restricted-operation region warrants a more extreme response to guarantee that the UV will comply, including, but not limited to, jamming, intercepting, physically blocking, and others. Operation within a given restricted region may involve satisfying a prerequisite other than location. For example, a UV may need to negotiate a payment in order to enter a given region.

Under certain conditions, restricted-operation regions may overlap, and vehicle 410 may receive restricted operation data from more than one restricted-operation region. Accordingly, vehicle 410 includes functionality that allows vehicle 410 to select one operation policy if vehicle 410 is attempting to operate in more than one restricted-operation region. For example, if vehicle 410 is within a notification sub-region of a first restriction-operation region and within a warning sub-region of a second restricted-operation region, vehicle 410 may prioritize a warning over a notification and select and implement the instructions of the second restricted-operation region. Additionally, vehicle 410 may always prioritize limited-operation sub-regions over either notification sub-regions or warning sub-regions. Additionally, if the multiple sub-regions in which vehicle 410 is attempting to operate are the same such that no one sub-region has priority, vehicle 410 may randomly select any one of the sub-regions.

Figure 4B:
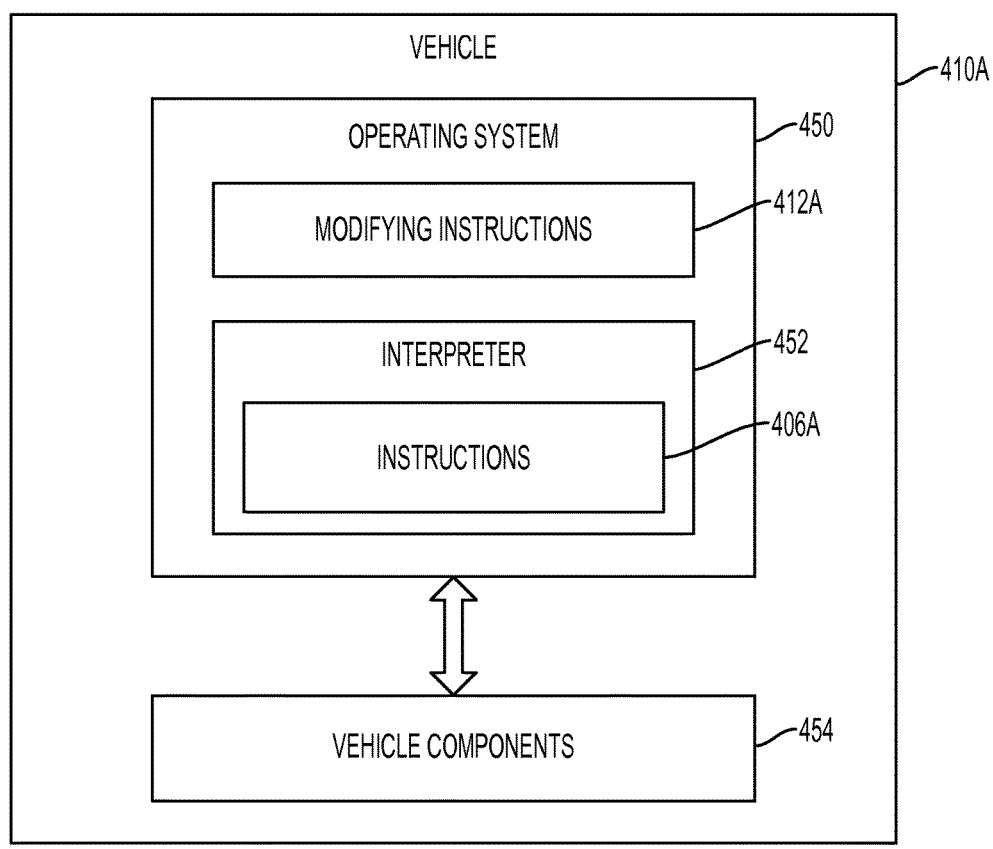
FIG. 4B depicts a diagram illustrating additional details of the vehicle shown in FIG. 4A.

FIG. 4B depicts a vehicle 410A that includes additional details of vehicle 410 shown in FIG. 4A. As shown in FIG. 4B, vehicle 410A includes an operating system 450, a set of modifying instructions 412A, an interpreter 452 for instructions 406A, instructions 406A and vehicle components 454, configured and arranged as shown. Instructions 406A run inside interpreter 452. Modifying instructions 412A function to selectively connect operating system 450 to vehicle components 454, which include but are not limited to an actuation and/or locomotion module (e.g., landing gear, wheels), sensors (e.g., a camera), an operational controller (e.g., a flight controller), a path planning module (e.g., a flight planner), a position determination module (e.g., a GPS module), a network communications module (to connect to cloud 50), a receiver system having at least one receiver (to receive, for example, modifying instructions, instructions, transmissions from a beacon, and the like), a clock, a sound generator module (for audible alerts), lights (for visible alerts), a motor (for powering down). It is understood that any reference in the present disclosure to the configuration shown in vehicle 410 includes a reference to the configuration shown in vehicle 410A. Additionally, any reference in the present disclosure to modifying instructions 412 and/or instructions 406 include a reference to modifying instructions 412A and/or instructions 406A.

FIG. 5A depicts a diagram illustrating a three-dimensional view of an exemplary restricted-operation region 500 according to one or more embodiments. The cylindrical shape of restricted-operation region 500 is for illustration purposes, and any shape is suitable for restricted-operation region 500, including irregular and/or asymmetrical shapes. Restricted-operation region 500 is defined in multiple dimensions, including, for example, space and time, such as a 4-D area having X, Y and Z axes, plus a time element. A range of technologies may be used to form restricted-operation region 500. For example, restricted-operation region 500 may be formed by a transmitter located within restricted-operation 500 or outside restricted-operation region 500 (e.g., cloud 50 shown in FIGS. 2 and 4). For ease of illustration, restricted-operation region 500 is formed by a transmitter 502 located within restricted operation region 500. FIG. 5B is a top view of restricted-operation region 500 showing various sub-regions of restricted-operation region 500. The plurality of sub-regions may include, for example, a notification sub-region 504, a warning sub-region 506 and a limited-operation sub-region 508.

A range of technologies may be used to implement restricted-operation region 500. One or more embodiments of the present disclosure locate transmitter 502 at a location within restricted-operation region 500, and implement transmitter 502 as a non-directional beacon (NDB) having X, Y and Z axes, plus a time element. In general, an NBD is a radio transmitter at a known location. NDBs are often used as aviation or marine navigational aids. The signal transmitted does not include inherent directional information, in contrast to other navigational aids such as low frequency radio range, VHF omni-directional range (VOR) and TACAN. NDB signals follow the curvature of the Earth, so they can be received at much greater distances at lower altitudes. However, NDB signals are relatively more subject to influence by atmospheric conditions, mountainous terrain, coastal refraction and electrical storms, particularly at long range. NDBs used for aviation are standardized by ICAO Annex 10, which specifies that NDBs be operated on a frequency between 190 kHz and 1750 kHz, although normally all aviation NDBs in North America operate between 190 kHz and 535 kHz. Each NDB is identified by a one, two, or three-letter Morse code call-sign. North American NDBs are categorized by power output, with low power rated at less than 50 watts, medium from 50 watts to 2,000 watts and high being over 2,000 watts.

NDB navigation consists of two parts, namely, the automatic direction finder (or ADF) equipment on the aircraft that detects an NDB signal, and the NDB transmitter. The ADF can also locate transmitters in the standard AM medium wave broadcast band, which is 530 kHz to 1700 kHz at 10 kHz increments in the Americas, and 531 kHz to 1602 kHz at 9 kHz increments outside of the Americas. ADF equipment determines the direction to the NDB station relative to the UAV. This may be displayed on a relative bearing indicator (RBI). This display looks like a compass card with a needle superimposed, except that the card is fixed with the zero (0) degree position corresponding to the centerline of the aircraft.

Figure 6:
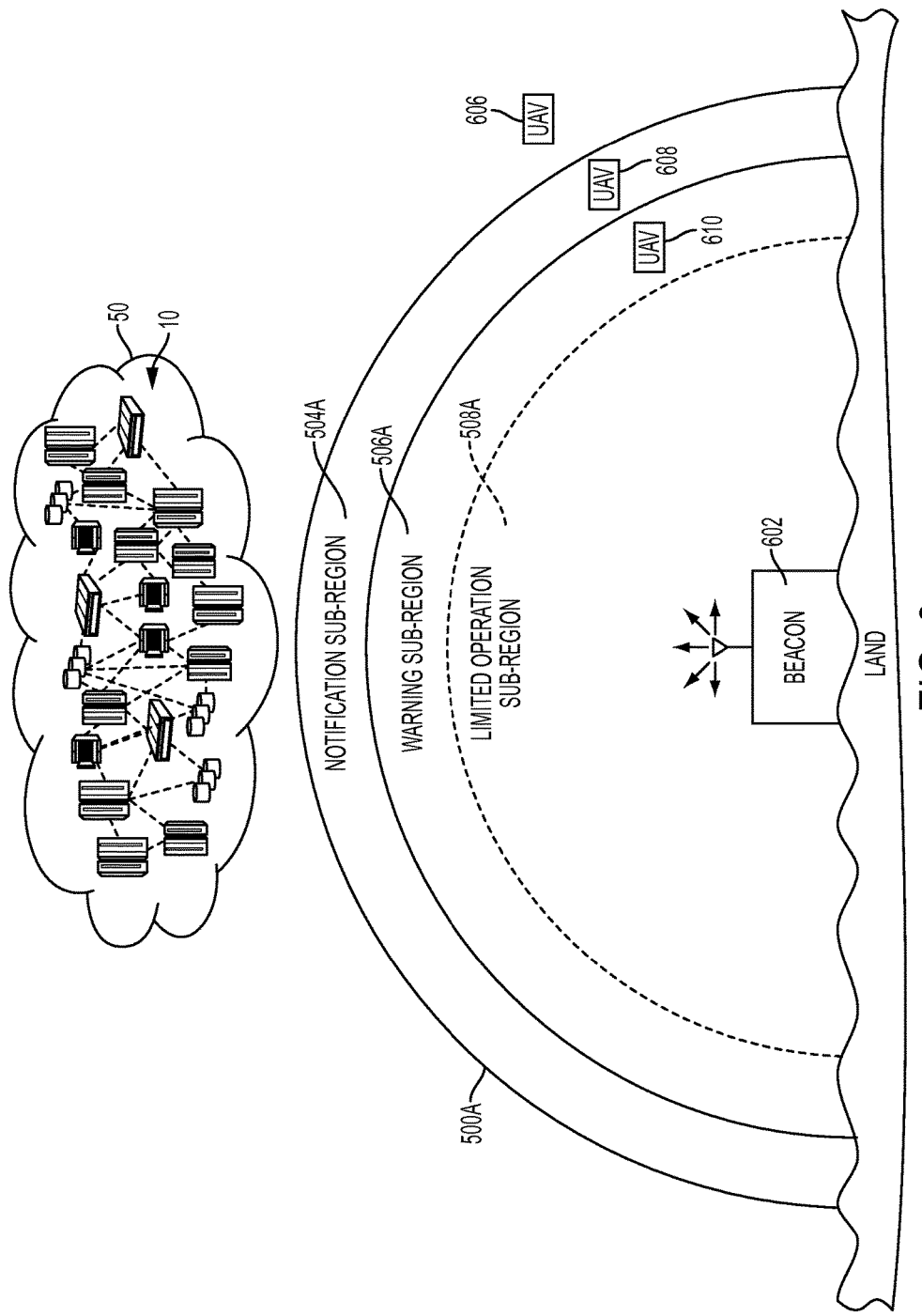
FIG. 6 depicts a diagram illustrating a more specific implementation of the system shown in FIG. 4A.

FIG. 6 depicts a diagram illustrating a system 600 according to one or more embodiments. More specifically, system 600 is a particular implementation of the system 400 (shown in FIG. 4A), wherein system 600 utilizes a stationary transmitter located within the restricted-operation region, along with NDB technology to define the restricted-operation region. Thus, system 600 includes an NDB transmitter 602 and cloud 50, configured and arranged as shown. NDB transmitter 602 defines a restricted-operation region 500A having a notification sub-region 504A, a warning sub-region 506A and a limited-operation sub-region 508A. A first UAV 606 is shown operating outside restricted-operation region 500A. A second UAV 608 is shown operating within notification sub-region 504A. A third UAV 610 is shown operating within warning sub-region 508A. Cloud 50 may supplement, support or replace some or all of the functionality of NDB transmitter 602, first UAV 606, second UAV 608 and third UAV 610. Additionally, some or all of the functionality of NDB transmitter 602, first UAV 606, second UAV 608 and third UAV 610 may be implemented as a node 10 (shown in FIGS. 1 and 2) of cloud 50.

The operation of system 600 will now be described. It is assumed in the immediately following description of system 600 that instructions 406 reflecting an operation policy of restricted-operation region 500A and its sub-regions (504A, 506A, 508A) have been developed in accordance with system 400 shown in FIG. 4A. It is further assumed that UAVs 606, 608, 610 have been modified to include modifying instructions 412 shown in FIGS. 4A and 4B, and that instructions 406 have been loaded into UAVs 606, 608, 610 using one of the methodologies illustrated in FIG. 4A and described earlier in this disclosure. It is further assumed that UAVs 606, 608, 610 each include sufficient ADF or equivalent functionality to allow each UAV 606, 608, 610 to determine its position with respect to NDB transmitter 602.

First UAV 606 is sufficiently close to restricted-operation region 500A that it picks up a signal from NDB transmitter 602. However, based at least in part on a determination of a position of first UAV 606 with respect to NDB transmitter 602, modifying instructions (e.g., modifying instructions 412, 412A shown in FIGS. 4A and 4B) of first UAV 606 determines that first UAV 608 is outside of restricted-operation region 500A. Accordingly, no action is taken by computer software 406 to take over operation of first UAV 606. Second UAV 608 is sufficiently close to restricted-operation region 500A that it picks up a signal from NDB transmitter 602. Based at least in part on a determination of a position of second UAV 608 with respect to NDB transmitter 602, modifying instructions (e.g., modifying instructions 412 and 412A shown in FIGS. 4A and 4B) of second UAV 608 determines that second UAV 608 is within notification sub-region 504A of restricted-operation region 500A. Accordingly, instructions 406 implement a notification communication function of second UAV 608. Third UAV 610 is sufficiently close to restricted-operation region 500A that it picks up a signal from NDB transmitter 602. Based at least in part on a determination of a position of third UAV 610 with respect to NDB transmitter 602, modifying instructions (e.g., modifying instructions 412, 412A shown in FIGS. 4A and 4B) of third UAV 610 determines that third UAV 610 is within warning sub-region 506A of restricted-operation region 500A. Accordingly, instructions 406 implement a warning communication function of third UAV 610. If third UAV 610 attempt to enter into limited-operation sub-region 508A, based at least in part on a determination of a position of third UAV 610 with respect to NDB transmitter 602, modifying instructions (e.g., modifying instructions 412, 412A shown in FIGS. 4A, 4B) of third UAV 610 determines that third UAV 610 is attempting to enter limited-operation sub-region 508A of restricted-operation region 500A. Accordingly, instructions 406 implement a limited-operation function of third UAV 610. Examples of limited-operation functionality include, but are not limited to, instructing a UAV to power down, controlling the flight of a UAV to move it away from the limited-operation region, disabling surveillance functionality of a UAV, and others.

Figure 7:
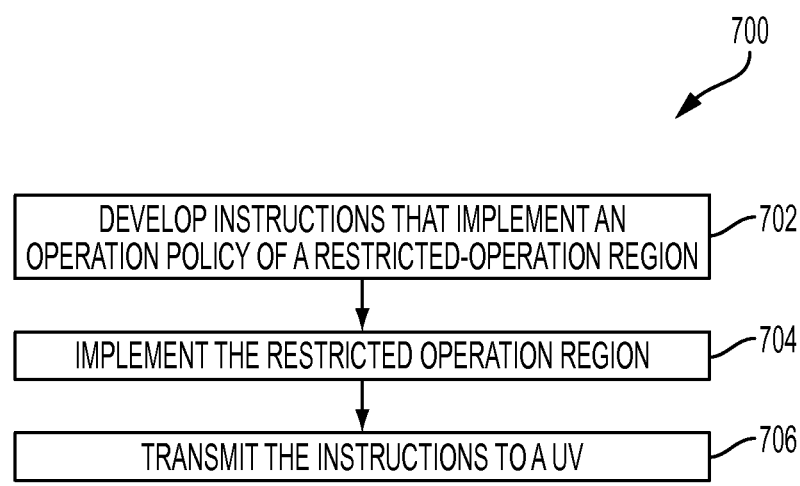
FIG. 7 depicts a flow diagram of a methodology according to one or more embodiments.

FIG. 7 illustrates a flow diagram of a methodology 700 performed by system 400 (shown in FIG. 4A) in accordance with one or more embodiments. Methodology 700 begins at block 702 by developing instructions that, when implemented, will control the operation of a UV to conform to an operation policy of a particular location. Block 704 implements the restricted-operation region. The restricted-operation region may be stationary or moving. The restricted-operation region may also be divided into a plurality of sub-regions. A variety of technologies may be utilized to implement the restricted-operation region, including but not limited to a NDB transmitter. Block 706 transmits the instructions to a UV. When interpreted by the UV, the instructions implement the operation policy of the particular location by controlling at least one function of UV if/when it attempts to operate within the restricted-operation region. A processor of the UV is configured to interpret the instructions based at least in part on a determination that the UV is attempting to operate within the restricted-operation region.

Figure 8A:
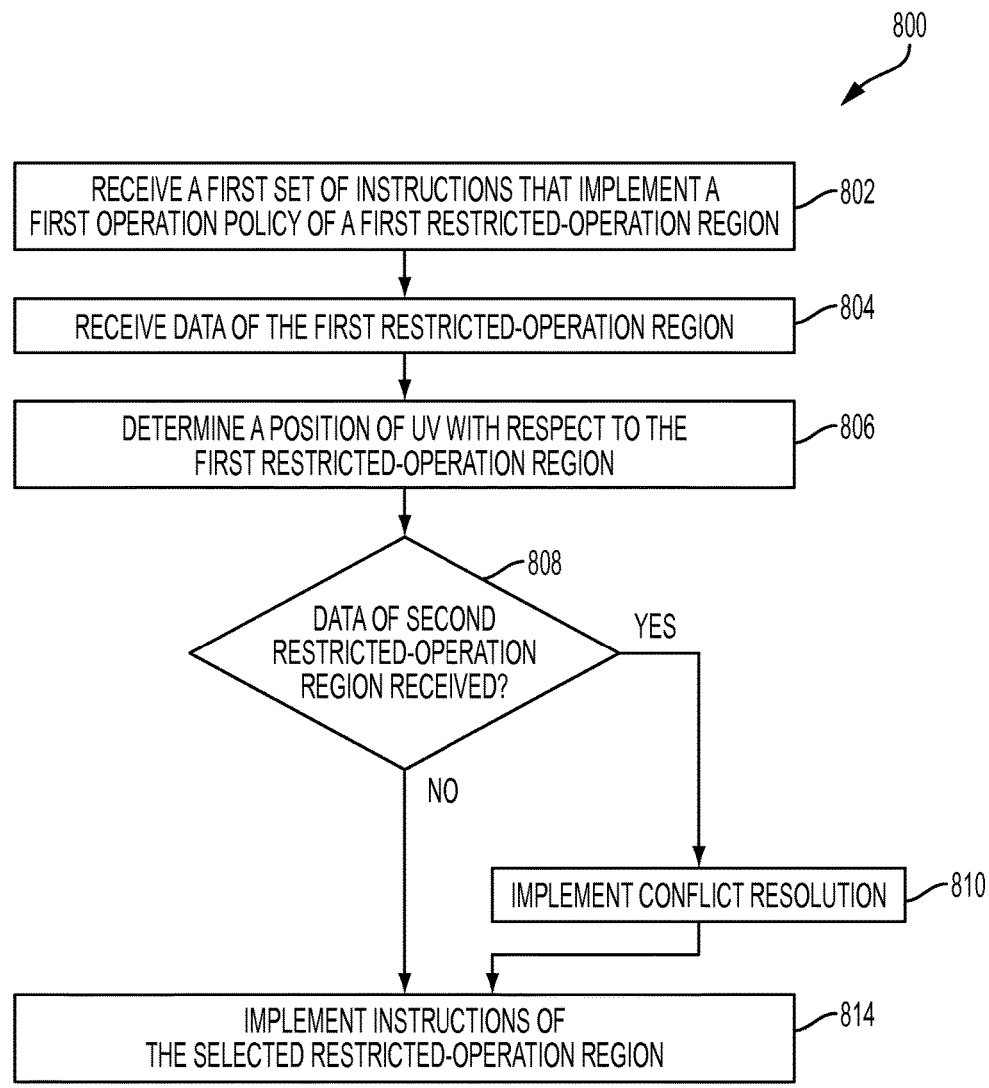
FIG. 8A depicts a flow diagram of a methodology according to one or more embodiments.

FIG. 8A illustrates a flow diagram of a methodology 800 performed by vehicle 410 (shown in FIG. 4A) in accordance with one or more embodiments. Methodology 800 begins at block 802 by receiving a first set of computer program instructions that implement a first operation policy of a first restricted-operation region. The first set of instructions, when interpreted, implements the first operation policy by controlling at least one function of the vehicle or UV. At block 804, data of the first restricted-operation region is received. The data of the first restricted-operation region may include any type of data about dimension (e.g., space and time dimensions) of the first restricted-operation region. Block 806 determines a position of the UV with respect to the first restricted-operation region. Decision block 808 determines whether or not data of a second restricted-operation region is being received. If the answer to the inquiry at decision block 808 is yes, methodology 800 proceeds to block 810 to implement a conflict resolution procedure that selects either the first restricted-operation region or the second restricted operation region based on predetermined criteria. From block 810, methodology 800 proceeds to block 814. If the answer to the inquiry at decision block 808 is no, methodology 800 proceeds to block 814. Block 814 0 to implement a conflict resolution procedure that selects either the first restricted-operation region or the second restricted operation region based on predetermined criteria. From block 810, methodology 800 proceeds to block 814. Block 814 implements the set of instructions of the selected restricted-operation region. The selected set of instructions, when interpreted, implements the selected operation policy by controlling at least one function of the UV. A processor of the UV interprets the selected set of instructions based at least in part on using data of the selected restricted-operation region to determine that the UV is attempting to operate within the selected restricted-operation region.

Figure 8B:
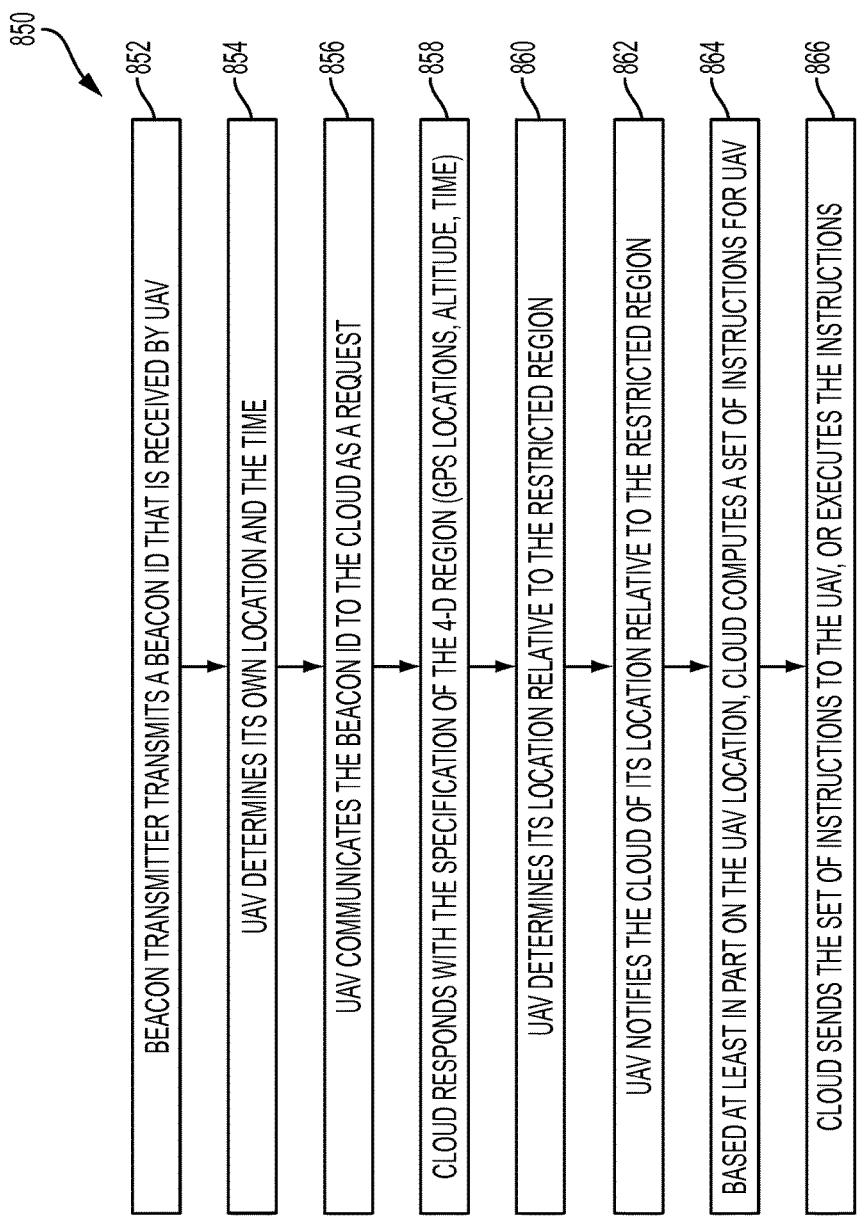
FIG. 8B depicts a flow diagram of a methodology according to one or more embodiments.

FIG. 8B illustrates a flow diagram of a methodology 850 performed by UV 416 (shown in FIG. 4A) in accordance with one or more embodiments. Methodology 850 begins at block 852 wherein the beacon transmitter transmits a beacon ID that is picked up by UAV. In block 854, the UAV determines its own location and the time. In block 856 the UAV communicates the beacon ID to the cloud service provider as a request. In block 858, the cloud service provider responds with the specification of the 4-D region (e.g., GPS locations, altitude, time, etc.). In block 860, the UAV determines where it is relative to the restricted region, assuming that the UAV is attempting to enter the region as opposed to being within the region when it attempts to power up and take off. For example, the UAV may be within the region, or approaching it, or above/below/within/outside it, etcetera. In block 862, the UAW notifies the cloud service provider of its location relative to the restricted region. In block 864, based at least in part on the UAV location, the cloud service provider computes a set of instruction for controlling the operation of the UAV in accordance with an operating policy of the restricted region. In block 866, the cloud service provider sends the set of instructions to the UAV. The cloud service provider in block 866 may also just execute the instructions for certain instructions such as sending an email. Some instructions may be complex in that they initiate execution steps that may be carried out by the UAV alone, the cloud service provide alone, or the UAV and the cloud service provider working in tandem.

In methodology 850, the cloud service provider sends a specification of the region, e.g. GPS coordinates of vertices of some sort of 3D polyhedron, plus a standardized time interval of when this 3D region is considered sensitive. It is up to the UAV itself to determine whether it has entered the given 4D volume or will enter it. In block 864, the cloud service provider sends a specification (data) of prescribed remedies that is based on the UAV violates different regions, e.g. descend and land, veer off within 10 seconds, disable camera, etcetera, and the UAV must give priority to these. Operations that may be curtailed within the restricted region may include recording broadcasting audio/visual or sensory information about a space, changing the physical state of that space in any way (e.g. sampling, picking up/dropping objects from/in that space), live communication with other objects/people temporarily or permanently located in that space, entering that space as a group of connected UVs, flying within a certain altitude at a certain speed for a certain amount of time, or landing in that space.

In alternative embodiments of methodology 850, the beacon transmitter and blocks 852, 854, 856 and 858 may be omitted, and instead, the UAV would regularly reports its position and trajectory to a server, which compares it to all stored 4-D regions (using its local clock) and possibly returns action restrictions or suggestions to the UAV.

There may be applications, e.g. military, wherein it would be necessary to keep the full operation policy secret. In such cases, the beacon transmitter itself (or some other sensor) could determine that the UAV has violated the 4D volume that defines the restricted region. In such a case, the required action would be broadcast (e.g., "UAV 23-417, camera off!," and the UAV would have to perform the action.

There may situations in which communication of the instructions implementing the policy first requires the transmission of a digital certificate (X.509) to determine the UV's trust in the server from which it is receiving policy data. If the server is not trusted, then the UV may take actions to alert interested parties.

In another alternative, the UAV may not include a transmitter for two-way communication. In this case the "beacon" (or equivalently, the "server") could broadcast its policy in an agreed upon format. The UAV would then determine its relation to the 4-D regions and implement the prescribed actions locally.

Thus it can be seen from the forgoing detailed description that one or more embodiments of the present disclosure provide technical benefits and advantages. Instead of requiring significant modifications to the operation of the UV, the present disclosure provides a virtual or physical restricted-operation region. In one or more embodiments wherein the UV is a UAV, the restricted operation region may be defined by a beacon transmitter that can be placed at a location or put aboard a moving vehicle (e.g., a truck, ship, etc.) that broadcasts a signal that includes the operational policy for the restricted-operation region. UAVs are required to be detectable by beacons, receive and operate without violating the operational policy. This could involve overriding its own mode of operation, negotiating an acceptable compromise to its mode of operation or supplementing its mode of operation. In essence, the disclosed systems and methodologies allow the "location" to define its restricted-operation region, create an operation policy for UAVs that attempt to operate within its restricted-operation region, and allow the "location" (via instructions and or control signals) to control UAVs in the vicinity instead of allowing UAVs to operate without regard to the operation policies of the restricted operation region.

The necessary modifications to a standard UV in order to interface with the disclosed systems and methodologies are relatively minimal. For example, in one or more embodiments wherein the UV is a UAV, the disclosed system includes modifying instructions and other instructions that can run as an application on top of the UAV operating system. These relatively minor modifications allow the UAV to implement the following steps: receive the operational policy as a sequence of actions and/or constraints on operation of the UAV and its onboard devices; interpret the sequences of actions; check the UAV's location (e.g., using GPS coordinates, altimeter readings, convex hull intersections, etc.) to monitor the constraints; if a constraint is violated, the UAV runs a set of action rules that may alert the operator of the UAV, the beacon transmitter, or others via sound, electronic message, visual flag, flying pattern (including alternate route), etcetera; if the UAV receives constraints on operation, it modifies the current path to avoid violating the constraints, if needed; set up a timed/triggered operation for the onboard devices according to the new path; and, if avoiding violating the constraints is not possible, the UAV runs another set of action rules that may alert the police, other human enforcers or people in the affected area(s). The UAV may also handle multiple conflicting beacons through a policy such as listening to the most critical beacons first (e.g., military, airport, etc.), listening to the closest beacon and allowing critical "interrupts" such as a "power down" instruction.

Figure 9:
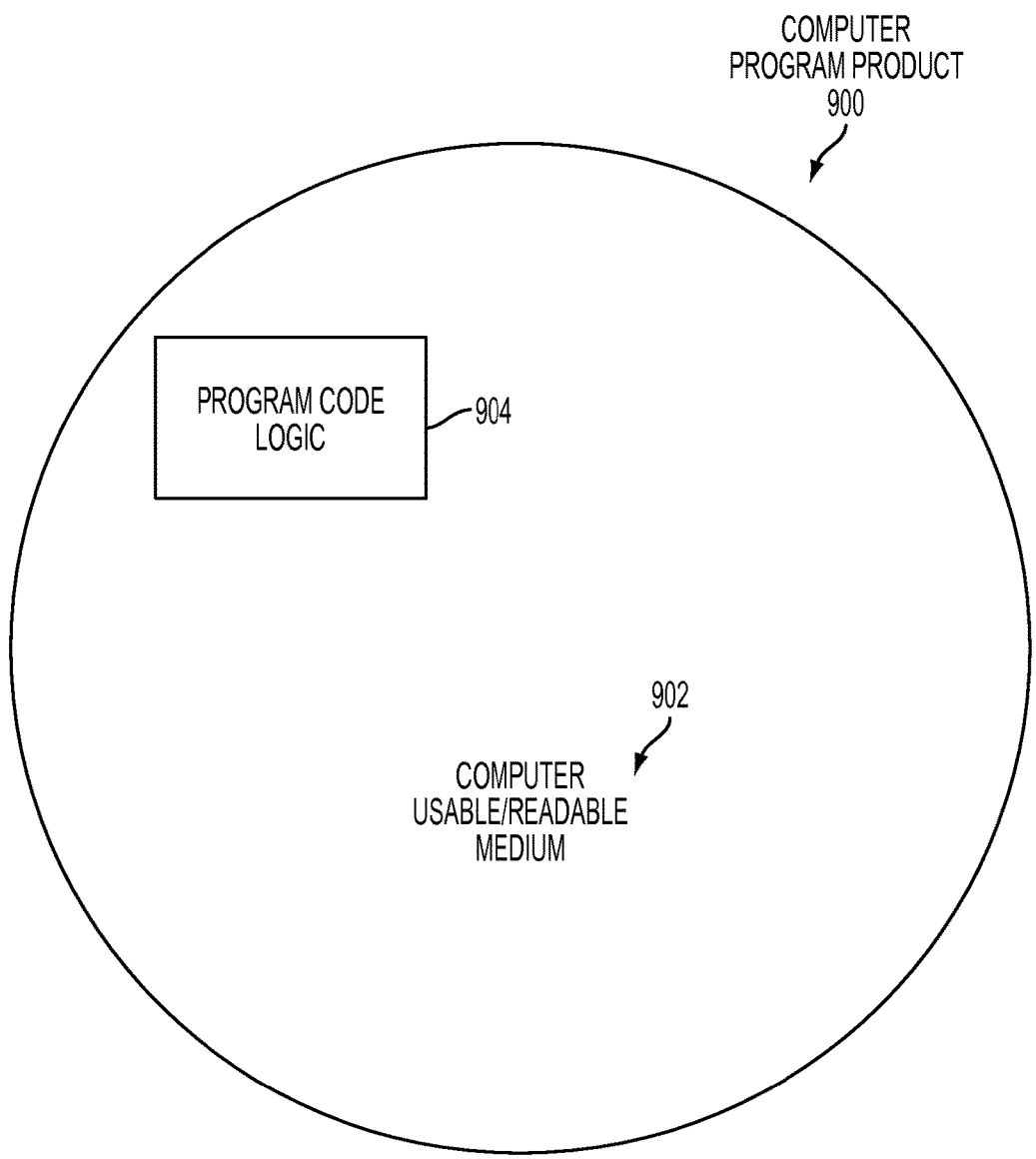
FIG. 9 depicts a diagram of a computer program product according to one or more embodiments.

Referring now to FIG. 9, a computer program product 900 in accordance with an embodiment that includes a computer readable storage medium 902 and program instructions 904 is generally shown.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An information processing system for implementing a restricted-operation region, the information processing system comprising:
    a memory;
    a first processor device communicatively coupled to said memory;
    a first transmitter device; and
    a computer program instruction development module communicatively coupled to said memory, said first processor device and said first transmitter device, wherein said computer program instruction development module is configured to develop a set of computer readable program instructions configured such that, based at least in part on being downloaded by a second processor device of a vehicle, the set of computer readable program instructions modify operation of the vehicle in a manner that enables the second processor device of the vehicle to interpret control instructions and process data that implement an operation policy of the restricted-operation region by controlling at least one function of the vehicle based at least in part on the vehicle attempting to operate within the restricted-operation region;
    the information processing system configured to perform a method comprising:
    transmitting, by said first transmitter device, said set of computer readable program instructions to said vehicle;
    wherein set of computer readable program instructions are further configured to, based at least in part on a determination that said vehicle is attempting to operate within the restricted-operation region, be downloaded by the second processor of the vehicle to modify operation of the vehicle in a manner that enables the second processor device of the vehicle to interpret control instructions and process data that implement the operation policy of the restricted-operation region;
    wherein the second processor device of the vehicle cannot interpret the control instructions and process the data without having downloaded the set of computer readable program instructions.

2. The information processing system of claim 1, wherein the set of computer readable program instructions modify operation of the vehicle by modifying an operating system of the vehicle to generate a modified operating system of the vehicle configured to enable an interpreter of the modified operating system to run the control instructions.

3. The information processing system of claim 1, wherein said determination comprises at least one of the following:
    a comparison of a current position of said vehicle to said restricted-operation region; and
    a comparison of a projected future position of said vehicle to said restricted-operation region.

4. The information processing system of claim 1, wherein said first transmitter device comprises a remote computer configured to download said set of computer readable program instructions to said vehicle.

5. The information processing system of claim 1, wherein said at least one function of said vehicle comprises a surveillance function.

6. The information processing system of claim 1, wherein:
    the restricted-operation region further comprises a plurality of sub-regions;

at least one of said plurality of sub-regions comprises at least one of a notification sub-region, a warning sub-region and a limited-operation region;
wherein said at least one function comprises at least one of a:
notification communication function of a vehicle that attempts to operate within said notification sub-region;
warning communication function of a vehicle that is attempting to operate within said warning sub-region; and
limited-operation function of a vehicle that attempts to operate within said limited-operation sub-region.

7. An information processing system for implementing a restricted-operation region, the information processing system comprising:
a memory;
a first processor device communicatively coupled to said memory;
a first transmitter device; and
a computer program instruction development module communicatively coupled to said memory, said first processor device and said first transmitter device, wherein said computer program instruction development module is configured to develop a set of computer readable program instructions configured such that, based at least in part on being downloaded by a second processor device of a vehicle, the set of computer readable program instructions modify operation of the vehicle in a manner that enables the second processor device of the vehicle to interpret control instructions and process data that implement an operation policy of the restricted-operation region by controlling at least one function of the vehicle based at least in part on the vehicle attempting to operate within the restricted-operation region;
the information processing system configured to perform a method comprising:
transmitting, by said first transmitter device, said set of computer readable program instructions to said vehicle;
wherein said set of computer readable program instructions are further configured to, based at least in part on a determination that the vehicle is attempting to operate within the restricted operation region, be downloaded by the second processor of the vehicle to modify operation of the vehicle in a manner that enables the second processor device of the vehicle to interpret control instructions and process data that implement the operation policy of the restricted-operation region;
wherein the second processor device of the vehicle cannot interpret the control instructions and process the data without having downloaded the set of computer readable program instructions;
wherein the restricted operation region is defined by a beacon;
wherein said beacon is transmitted by said first transmitter device of the information processing system;
wherein said beacon is configured to be received by said vehicle;
wherein said determination that said vehicle is attempting to operate within the restricted-operation region is based at least in part on said beacon.

8. The information processing system of claim 7, wherein said determination comprises at least one of the following:
a comparison of a current position of said vehicle to said restricted-operation region; and
a comparison of a projected future position of said vehicle to said restricted-operation region.

9. The information processing system of claim 7, wherein the set of computer readable program instructions modify operation of the vehicle by modifying an operating system of the vehicle to generate a modified operating system of the vehicle configured to enable an interpreter of the modified operating system to run the control instructions.

10. The information processing system of claim 7, wherein:
the restricted-operation region further comprises a plurality of sub-regions;
at least one of said plurality of sub-regions comprises at least one of a notification sub-region, a warning sub-region and a limited-operation region;
wherein said at least one function comprises at least one of a:
notification communication function of a vehicle that attempts to operate within said notification sub-region;
warning communication function of a vehicle that is attempting to operate within said warning sub-region; and
limited-operation function of a vehicle that attempts to operate within said limited-operation sub-region.

11. An information processing system for implementing a restricted-operation region, the information processing system comprising:
a memory;
a first processor device communicatively coupled to said memory;
a first transmitter device; and
a computer program instruction development module communicatively coupled to said memory, said first processor device and said first transmitter device, wherein said computer program instruction development module is configured to develop a set of computer readable program instructions configured such that, based at least in part on being downloaded by a second processor device of a vehicle, the set of computer readable program instructions modify operation of the vehicle in a manner that enables the second processor device of the vehicle to interpret control instructions and process data that implement an operation policy of the restricted-operation region by controlling at least one function of a vehicle that attempts to operate within the restricted-operation region;
the information processing system configured to perform a method comprising:
transmitting, by said first transmitter device, said set of computer readable program instructions to a first remote computer;
wherein said set of computer readable program instructions are further configured to, based at least in part on a determination that the vehicle is attempting to operate within the restricted operation region, be downloaded from the first remote computer by the second processor of the vehicle to modify operation of the vehicle in a manner that enables the second processor device of the vehicle to interpret control instructions and process data that implement the operation policy of the restricted-operation region;
wherein the second processor device of the vehicle cannot interpret the control instructions and process the data without having downloaded the set of computer readable program instructions.

12. The information processing system of claim 11, wherein said first remote computer comprises a node of a cloud computing system.

13. The information processing system of claim 11, wherein:

the restricted operation region is defined by a beacon;
said beacon is transmitted by a second transmitter device of the information processing system;
said beacon is configured to be received by said vehicle; and
said determination that said vehicle is attempting to operate within the restricted-operation region is based at least in part on said beacon.

14. The information processing system of claim 11, wherein said determination comprises at least one of the following:

a comparison of a current position of said vehicle to said restricted-operation region; and
a comparison of a projected future position of said vehicle to said restricted-operation region.

15. The information processing system of claim 12, wherein said first transmitter device comprises a second remote computer configured to download said set of computer readable program instructions to said first remote computer.

16. The information processing system of claim 11, wherein the set of computer readable program instructions modify operation of the vehicle by modifying an operating system of the vehicle to generate a modified operating system of the vehicle configured to enable an interpreter of the modified operating system to run the control instructions.

17. The information processing system of claim 11, wherein:

the restricted-operation region further comprises a plurality of sub-regions;
at least one of said plurality of sub-regions comprises at least one of a notification sub-region, a warning sub-region and a limited-operation region;
wherein said at least one function comprises at least one of a:
notification communication function of a vehicle that attempts to operate within said notification sub-region;
warning communication function of a vehicle that is attempting to operate within said warning sub-region; and
limited-operation function of a vehicle that attempts to operate within said limited-operation sub-region.

* * * * *